Patented June 15, 1937

2,083,694

UNITED STATES PATENT OFFICE 2,083,694

MANUFACTURE OF ARTIFICIAL MATERIALS

Henry Dreyfus, London, England

No Drawing. Application October 23, 1934, Serial No. 749,674. In Great Britain November 22, 1933

10 Claims. (Cl. 18—54)

This invention relates to the manufacture of artificial filaments, threads, yarns, ribbons, foils and other products, especially those having a basis of cellulose acetate or other organic derivative of cellulose.

I have discovered that by the introduction of lignin or a derivative thereof into artificial materials, and particularly artificial materials containing cellulose acetate or other organic derivative of cellulose, novel products having valuable properties may be obtained. For example, by the incorporation of such substances in filaments, threads and other artificial materials, products having a modified lustre or exhibiting special dyeing effects may be produced, and in a similar manner artificial filaments, foils and like products having improved mechanical properties, for example an improved tensile strength, may also be obtained.

While the invention may be employed in connection with artificial materials broadly, it is of particular value in the manufacture of artificial filaments, threads, ribbons, foils and other products having a basis of cellulose acetate or other organic derivative of cellulose and will therefore be described with particular relation thereto.

As stated above, the new products of the present invention are obtained by incorporating therein lignin or a derivative thereof. In the case of lignin itself, while the type which is insoluble in most organic solvents may be employed, preferably modifications which are soluble in the common organic solvents are used, since the best method of producing the products of the present invention is their manufacture from a solution containing the organic derivative of cellulose and the lignin or derivative of lignin in a dissolved state. Lignin derivatives which are particularly valuable for the purposes of the present invention are its esters and ethers, for example the acetyl, methyl and benzoyl derivatives, which are, in general, soluble in common organic solvents for cellulose acetate. Before use the substances employed according to the present invention may be treated to reduce their colouration, for example by solution and re-precipitation or by treatment with bleaching agents. The products obtained according to the present invention are quite distinct from those which may be obtained from wood from which the lignin has not been removed, or from derivatives thereof.

The proportion of lignin or lignin derivative employed according to the present invention is in general relatively low, for example from 1–3 up to 5 or 10% of the weight of the cellulose derivative, though a higher proportion may, if desired, be employed. As stated above, the preferred method of carrying out the present invention consists in the manufacture of the products from a solution containing the cellulose derivative and lignin or a derivative thereof in a dissolved state, though, if desired, the lignin may be present in the solution in the form of a dispersion, or formed materials may be treated with a solution or suspension of lignin or a derivative thereof. In this case the materials are preferably treated in a swollen condition, produced either by previous treatment with a swelling agent or by applying the lignin or derivative thereof in a medium comprising a swelling agent. When lignin or a derivative is employed in disperse form, the average particle size is preferably of the order of .0005–.003 mm.

Artificial filaments, threads, ribbons, foils and the like may be obtained according to the present invention by either wet or dry spinning processes. Thus, a solution of cellulose acetate, in acetone, dioxane or other suitable solvent, containing lignin or a derivative thereof may be extruded through suitable orifices into an evaporative medium or into a coagulating bath.

In the case of dry spinning processes the spinning solutions may contain medium or high boiling solvents and also non-solvents, provided that they are present in insufficient quantities to cause precipitation. Solvents, preferably volatile solvents, and non-solvents, may also be introduced into the evaporative atmosphere, particularly in the region surrounding the jet orifices. The spinning solutions, particularly when used for the production of filaments, may also contain other substances which have no filament forming properties, e. g. citric acid, in order to improve the cross-section of the materials, as described in U. S. application S. No. 650,855 filed 9th January, 1933.

When wet spinning processes are employed preferably coagulating media containing high concentrations of solvents of plasticizing agents, particularly relatively non-volatile solvents, are used, as is described in U. S. applications S. Nos. 402,785 filed 26th October, 1929 and 418,414 filed 3rd January, 1930. Such coagulating baths are advantageous, since the materials may be drawn down in such baths to fine denier. Similar advantages may be obtained, as is also described in U. S. application S. No. 402,785, by the use of after-treatment baths containing high concentrations of solvents or by the use of relatively non-volatile solvents in the spinning solution, or by a combination of these methods. Stretching may be effected by mechanical means, e. g. by means of rollers, or it may be effected or assisted by the use of moving fluids, and the stretching tension may be allowed to run back to the jet or may be partially or wholly prevented from so doing. Processes such as the above are described in U. S. Patents Nos. 2,027,419, 2,025,730, 2,054,852, and 2,002,066.

In connection with the manufacture of foils and like products, particular reference is made to the processes described in U. S. applications S. Nos. 681,166 filed 19th July, 1933, 681,493 filed 21st July, 1933, 684,221 filed 8th August, 1933, 686,313 and 686,314 both filed 22nd August, 1933, and 695,395 filed 27th October, 1933 and U. S. Patent No. 2,045,348. Such products may be subjected to longitudinal and/or transverse tension so as to stretch them as is described in the above applications and in U. S. Patent No. 2,034,716.

The following examples are given in order to illustrate the invention, but it is to be understood that they do not limit it in any way:—

*Example 1*

A 25% solution of cellulose acetate in acetone, containing .5% of lignin calculated on the weight of the solution, is spun through orifices having a diameter of about .08 mm. into an evaporative atmosphere at a speed of about 180 to 200 metres per minute. Artificial yarn having modified dyeing properties may thus be obtained.

*Example 2*

An artificial yarn similar to that obtained according to the process of the preceding example may be produced by dry spinning a 25% solution of cellulose acetate in acetone, which contains about 1% of an acetyl derivative of lignin calculated on the weight of the spinning solution.

*Example 3*

Hanks of cellulose acetate yarn are treated in a saturated solution of lignin in 50% aqueous methylated spirit at about 80°–90° for 15–30 minutes, and a delustred product is thus obtained.

The products obtained according to the present invention may be subjected to any desired after-treatment to improve their properties or for the production of special effects. Thus, the tenacity of artificial filaments, ribbons, foils and the like may be improved by subjecting them to stretching operations, as described, for example, in U. S. Patent No. 1,709,470 and U. S. applications S. Nos. 378,684 filed 16th July, 1929, 573,424 filed 6th November, 1931, 602,844 filed 2nd April, 1932 and 666,656 filed 18th April, 1933. Again, the products, and particularly products having a low extension such as may be produced in wet spinning operations or by the stretching of dry spun products, may be treated with shrinking agents, as described e. g. in U. S. Patent No. 2,058,422, either under such conditions that they are maintained at constant length or that acual shrinking occurs, in order to improve their extensibility.

Such processes may be carried out continuously with stretching operations, and, if desired, shrinking may precede stretching as is described in U. S. application S. No. 672,805 filed 25th May, 1933.

Artificial materials containing cellulose derivatives comprising saponifiable groups may be subjected to saponifying operations in order to remove such groups, and such operations may be carried out so that saponification is effected only to a small extent, e. g. to give a loss in weight of 5–10 or 15% of the cellulose derivative, or so that a complete or substantially complete saponification is produced. A partial saponification may be uniform throughout the materials, or materials may be produced in which the outer layers are substantially completely saponified, while the core of the materials is saponified to a smaller extent or is substantially unsaponified. Suitable saponifying agents are caustic soda, caustic potash, ammonia, organic amines and other alkaline reagents. The saponifying agents may be employed in a liquid medium, for example water or alcohol, and applied by bath processes or padding or spraying methods, particularly followed by a batching process, or they may be applied in the form of vapour, when volatile saponifying agents are employed, or as pastes. Thus, the materials may be treated with a saponifying medium and then rapidly dried as is described in U. S. Patents Nos. 1,884,622 and 1,884,623. When alcoholic saponifying media are employed the amount of alkali present may be less than that theoretically required to produce the required amount of saponification as described in British Patents Nos. 125,153 and 313,404. Again, saponification may be effected continuously with stretching, as described in U. S. Patent No. 2,053,766 or in the presence of caustic soda or other alkali metal compound and an auxiliary agent as described in U. S. Patent No. 2,049,430.

The materials may also be subjected to other operations in order to modify their properties or appearance. For example, they may be treated with hot aqueous media or wet steam in order to reduce or still further reduce their lustre, or finely divided organic or inorganic substances may be incorporated therein for the same purpose. They may be dyed with any suitable dyestuffs and special effects may be thus produced on account of the presence of the lignin or lignin derivative therein.

Artificial filaments, yarns and similar products obtained according to the present invention may be made up into knitted, netted or woven fabrics, and such filaments and the like may constitute either a part or the whole of such fabrics. Thus, woven fabrics may be produced in which the warp consists of the special yarns obtained according to the present invention, while the weft is an ordinary cellulose aceate yarn or is a normal natural or artificial cellulosic type of yarn. Again, threads containing the special products of the present invention associated with other materials may be obtained, for example by twisting together an ordinary cellulose acetate yarn with a yarn obtained by the process of the present invention.

While the process of the present invention is particularly valuable in connection with artificial materials containing cellulose acetate, it may also be employed in the manufacture of artificial materials containing other organic derivatives of cellulose, for example cellulose propionate, butyrate, benzoate, acetate-propionate, acetate-benzoate and other esters and mixed esters of cellulose, methyl, ethyl, butyl, benzyl and other cellulose ethers and mixed ethers and mixed ether-esters of cellulose, for example ethyl cellulose acetate and oxy ethyl cellulose acetate. Moreover, the invention may also be employed in the production of other artificial materials, for example materials containing regenerated cellulose.

What I claim and desire to secure by Letters Patent is:—

1. Process for the manufacture of artificial filaments, threads, yarns, ribbons and like filamentary products, which comprises forming a solution which has a basis of an organic derivative of cellulose and which contains a compound selected from the group consisting of lignin and organic esters and ethers thereof, and extruding such solution through a shaping device into a setting medium.

2. Process for the manufacture of artificial filaments, threads, yarns, ribbons and like filamentary products, which comprises forming a solution which has a basis of cellulose acetate and which contains dissolved therein a compound selected from the group consisting of lignin and organic esters and ethers thereof, and extruding such solution through a shaping device into an evaporative atmosphere.

3. Process for the manufacture of artificial filaments, threads, yarns, ribbons, and like filamentary products, which comprises forming a solution which has a basis of cellulose acetate and which contains fine particles of a compound selected from the group consisting of lignin and organic esters and ethers thereof, and extruding such solution through a shaping device into an evaporative atmosphere.

4. Process for the manufacture of artificial filaments, threads, yarns, ribbons and like filamentary products, which comprises forming a solution which has a basis of cellulose acetate and which contains dispersed therein particles of a compound selected from the group consisting of lignin and organic esters and ethers thereof, which have an average particle size of 0.0005 to 0.003 mm., and extruding such solution through a shaping device into an evaporative atmosphere.

5. Artificial filaments, foils and like products containing a compound selected from the group consisting of lignin and organic esters and ethers thereof.

6. Artificial filaments, threads, yarns, ribbons and like filamentary products having a basis of an organic derivative of cellulose and containing a compound selected from the group consisting of lignin and organic esters and ethers thereof.

7. Artificial filaments, threads, yarns, ribbons and like filamentary products having a basis of an organic derivative of cellulose and containing, substantially uniformly dispersed throughout their mass, fine particles of a compound selected from the group consisting of lignin and organic esters and ethers thereof.

8. Artificial filaments, threads, yarns, ribbons and like filamentary products having a basis of cellulose acetate and containing a compound selected from the group consisting of lignin and organic esters and ethers thereof.

9. Artificial filaments, threads, yarns, ribbons and like filamentary products having a basis of cellulose acetate and containing, substantially uniformly dispersed throughout their mass, fine particles of a compound selected from the group consisting of lignin and organic esters and ethers thereof.

10. Artificial filaments, threads, yarns, ribbons, and like filamentary products having a basis of cellulose acetate and containing, substantially uniformly dispersed throughout their mass, particles of a compound selected from the group consisting of lignin and organic esters and ethers thereof which have an average particle size of 0.0005 to 0.003 mm.

HENRY DREYFUS.

CERTIFICATE OF CORRECTION.

Patent No. 2,083,694.  June 15, 1937.

HENRY DREYFUS.

It is hereby certified that error appears in the printed specification of the above numbered patent requiring correction as follows: Page 1, second column, line 44, for the word "of" second occurrence, read or; page 2, first column, line 47, before "for" insert C.; and that the said Letters Patent should be read with these corrections therein that the same may conform to the record of the case in the Patent Office.

Signed and sealed this 20th day of July, A. D. 1937.

Henry Van Arsdale
Acting Commissioner of Patents.

(Seal)